(12) United States Patent
Ruiz

(10) Patent No.: US 7,756,378 B2
(45) Date of Patent: Jul. 13, 2010

(54) SPLICE REVOLVER, SPLICE MODULE AND METHOD OF ORGANIZING FIBER STRANDS IN THE SPLICE MODULE

(75) Inventor: Gil Ruiz, McKinney, TX (US)

(73) Assignee: Commscope, Inc. of North Carolina, Hickory, NC (US)

( * ) Notice: Subject to any disclaimer, the term of this patent is extended or adjusted under 35 U.S.C. 154(b) by 0 days.

(21) Appl. No.: 12/039,623

(22) Filed: Feb. 28, 2008

(65) Prior Publication Data

US 2009/0220204 A1    Sep. 3, 2009

(51) Int. Cl.
*G02B 6/00*    (2006.01)

(52) U.S. Cl. ........................ 385/135; 385/136; 385/137

(58) Field of Classification Search .......... 385/135–137
See application file for complete search history.

(56) References Cited

U.S. PATENT DOCUMENTS

| | | | | |
|---|---|---|---|---|
| 4,441,786 A | * | 4/1984 | Hulin et al. ................. | 385/139 |
| 4,913,512 A | * | 4/1990 | Anderton ..................... | 385/135 |
| 5,069,523 A | * | 12/1991 | Finzel et al. ................ | 385/135 |
| 5,278,933 A | * | 1/1994 | Hunsinger et al. .......... | 385/135 |
| 5,472,160 A | * | 12/1995 | Burek et al. ................. | 248/74.4 |
| 5,835,658 A | * | 11/1998 | Smith .......................... | 385/136 |
| 6,360,051 B1 | * | 3/2002 | Daoud ......................... | 385/137 |
| 6,480,660 B1 | * | 11/2002 | Reitmeier et al. ........... | 385/135 |
| 6,866,430 B1 | * | 3/2005 | Faiss et al. .................. | 385/96 |
| 6,898,346 B2 | * | 5/2005 | Mercey et al. ............... | 385/26 |
| 6,944,387 B2 | | 9/2005 | Howell et al. | |
| 7,130,519 B2 | | 10/2006 | Grubish et al. | |
| 7,239,789 B2 | | 7/2007 | Grubish et al. | |
| 2005/0180705 A1 | * | 8/2005 | Elkins et al. ................. | 385/100 |
| 2006/0093304 A1 | | 5/2006 | Battey | |
| 2006/0098932 A1 | | 5/2006 | Battey | |
| 2006/0204198 A1 | * | 9/2006 | Michiels ...................... | 385/135 |
| 2007/0125496 A1 | * | 6/2007 | Lundell et al. .............. | 156/414 |
| 2009/0060421 A1 | * | 3/2009 | Parikh et al. ................. | 385/71 |

\* cited by examiner

*Primary Examiner*—Ellen Kim
(74) *Attorney, Agent, or Firm*—Muncy, Geissler, Olds & Lowe, PLLC

(57) ABSTRACT

A splice revolver is provided for securing a plurality of splices in a splice module. The revolver has a revolver body with a plurality of channels there through for receiving splice sleeves. The revolver body is configured to be rotated by a user so that splice sleeves may be loaded into empty channels of the splice revolver to provide compact storage of, and easy access to, splice sleeves.

19 Claims, 5 Drawing Sheets

SPLICE REVOLVER, SPLICE MODULE AND METHOD OF ORGANIZING FIBER STRANDS IN THE SPLICE MODULE

BACKGROUND

1. Field of the Invention

Example embodiments of the present invention generally relate to a splice revolver, splice module and method of organizing fiber strands in the module.

2. Description of Related Art

Splice modules are employed for organizing glass fibers from a fiber optic cable as they are spliced to jumpers, such as "connecterized" fibers that are mated to connectors for snap-fit engagement to adaptors. FIG. 1 is a top view of a conventional splice module 10. The cover of module 10 has been removed to illustrate components therein.

Module 10 includes a housing 15 having a plurality of adaptors 20 therein that receive connectors 60. FIG. 1 shows one arrangement for cable installation into the module 10. The fiber optic cable 30 is pulled through a strain relief grommet 35 and secured at a cable tie 37. The cable jacket is removed, leaving exposed fiber strands 40 for splicing. The splices sleeves 42 are stored in a splice organizer 45. The spliced fibers, or connecterized fibers 50, are attached to connectors 60 and then typically collectively routed as one around a fiber guide 25. The connectors 60 are then mated with the adaptors. 20.

Even with such fiber organizing arrangements, great care must be taken to ensure that in routing the fibers 50 around the guide 25, there are no sharp bends or twists. Bends or twists can cause potential damage to the fibers 50 and/or signal attenuation due to micro-bends. This must be done by the on-site installer and there is little margin for error.

SUMMARY

An example embodiment is directed to a device for securing splices in a splice module. The device includes a rotatable body having a plurality of channels there through for receiving splice sleeves. The channels are sized to secure the splice sleeves therein.

Another example embodiment is directed to a device for facilitating the routing of fibers to fiber connectors. The device includes a generally cylindrical body having a plurality of spaced channels located around a circumference thereof and extending along a length of the cylindrical body for receiving splice sleeves. The cylindrical body is rotatable.

Another example embodiment is directed to a splice module. The splice module includes a housing and a plurality of adaptors affixed to the housing and adapted to receive a plurality of fiber connectors. The splice module includes a splice revolver adapted to rotate around an axis passing there through and including a plurality of channels sized to accommodate a splice sleeve.

Another example embodiment is directed to a splice revolver of a splice module. The slice revolver comprises a revolver body adapted to rotate so as to sequentially receive individual splice sleeves formed from splicing fiber strands of a cable.

Another example embodiment is directed to a method of organizing fiber strands in a splice module for routing to connectors in the module. In the method, at least one cable is fed into the splice module, and fiber strands of the cable are spliced into a plurality of splice sleeves. The splice sleeves are placed into a rotatable splice revolver of the module.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus do not limit the example embodiments.

DETAILED DESCRIPTION

The example embodiments in general relate to a splice revolver, splice module incorporating the revolver and a method of organizing fiber strands in the splice module with the splice revolver. The example splice revolver construction secures sleeves in a dense volume as these fibers are routed to connectors of a plurality of adaptors in the splice module. The example splice revolver uses less space within the splice module and thus may densely secure a plurality of splice sleeves therein.

Figure 2:
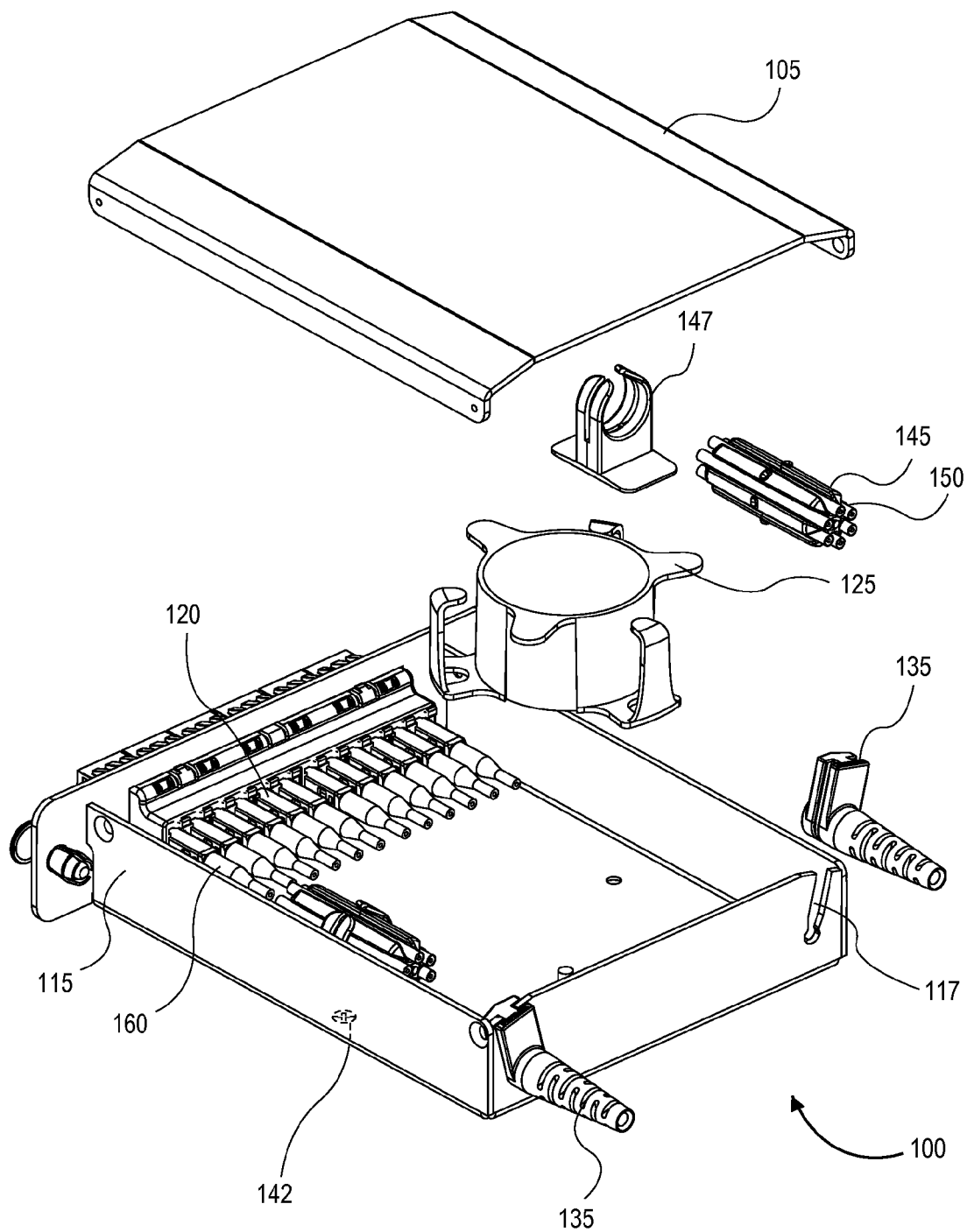
FIG. 2 is an exploded perspective view of a splice module in accordance with an example embodiment.

FIG. 2 is an exploded perspective view of a splice module 100 in accordance with an example embodiment. The splice module 100 includes a cover 105 and a module housing 115. A plurality of adaptors 120 are affixed to one end of the module housing 115. The plurality of adaptors 120 is configured to receive a plurality of connectors 160 in a snap-fit relation thereto. Module housing 115 further supports a fiber management spool 125 and one or more splice revolvers 145. The housing 115 includes slots 117 at either side along an end opposite that of the adaptors 120 for accommodating a pair of strain relief boots 135. Each strain relief boot 135 is adapted to receive a cable there through that is to be separated into fiber splices for routing to connectors 160 via the splice revolvers 145 and spool 125. Each strain relief boot 135 includes a pair of opposed recesses 137 that engage sides of the slots 117 in order to secure the boot 135 to the housing 115. It would be evident to one of skill in the art to include fewer or greater than two strain relief boots 135 and splice revolvers 145 in the splice module 100.

The splice revolver 145 has a generally cylindrical revolver body that is secured to the housing 115 via a splice mount 147. The splice mount 147 can be attached on any surface of the housing 115 via a fastener 142 such as a mounting screw. In one embodiment, the splice revolver 145 includes a minimum of six slots or channels designed to accept and hold splice sleeves 150. The splice sleeve 150 is configured to house or enclose one or more glass fiber strands therein. The splice sleeves 150 can be inserted into the channels one at a time as the splice revolver 145 rotates until all channels have a splice sleeve 150 therein. The splice revolver 145 revolves freely (clockwise and counter-clockwise) within the splice mount 147 proximate an axis thereof to avoid fiber twisting.

Figure 7:
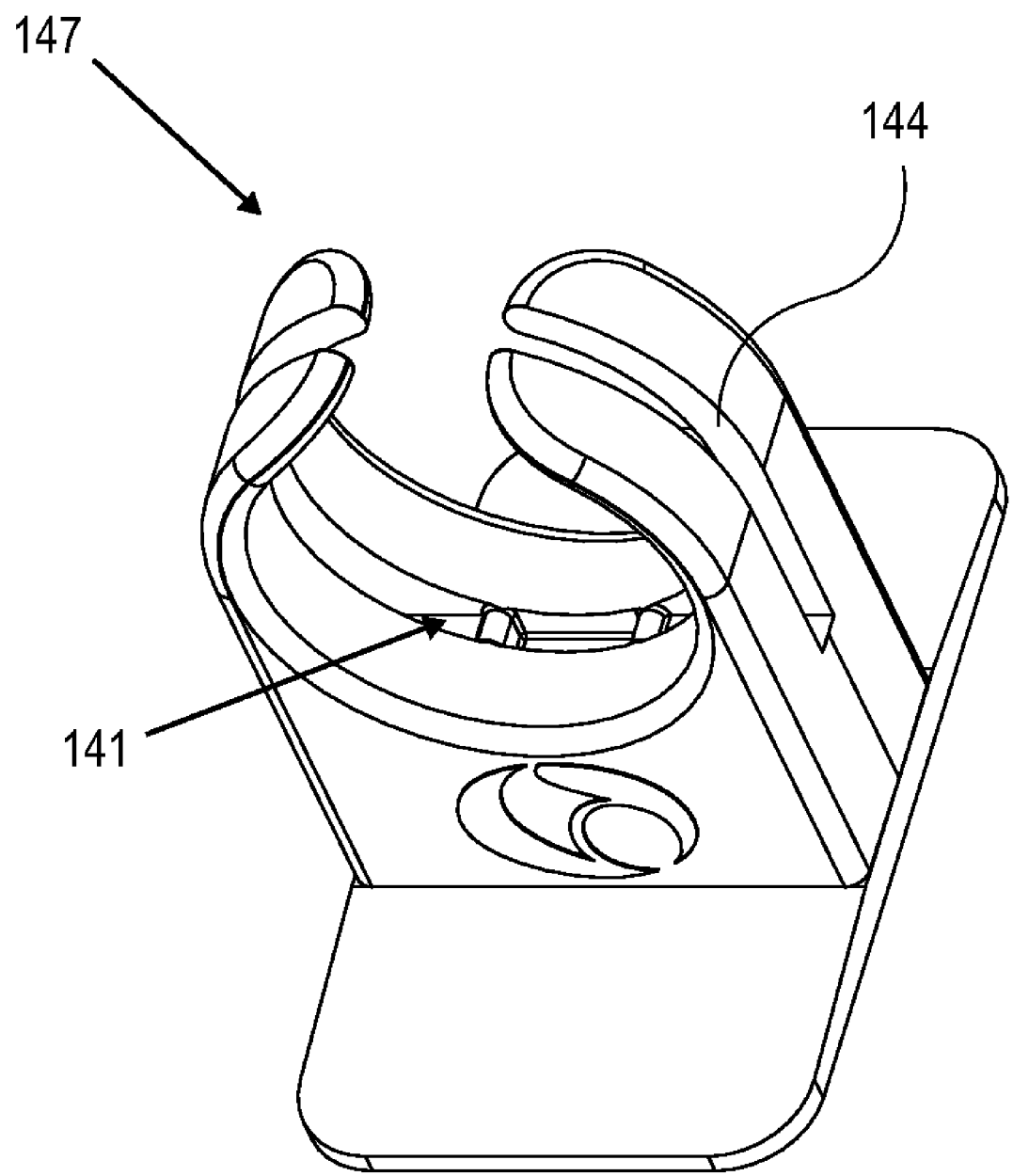
FIG. 7 is a perspective view of a splice mount.

As can be seen in FIG. 7, the splice mount 147 has detent features 141 to restrict the splice revolver 145 to an open or closed position. Upon the completion of inserting each of the splice sleeves 150, the splice revolver 145 is rotated to a closed position.

Figure 3:
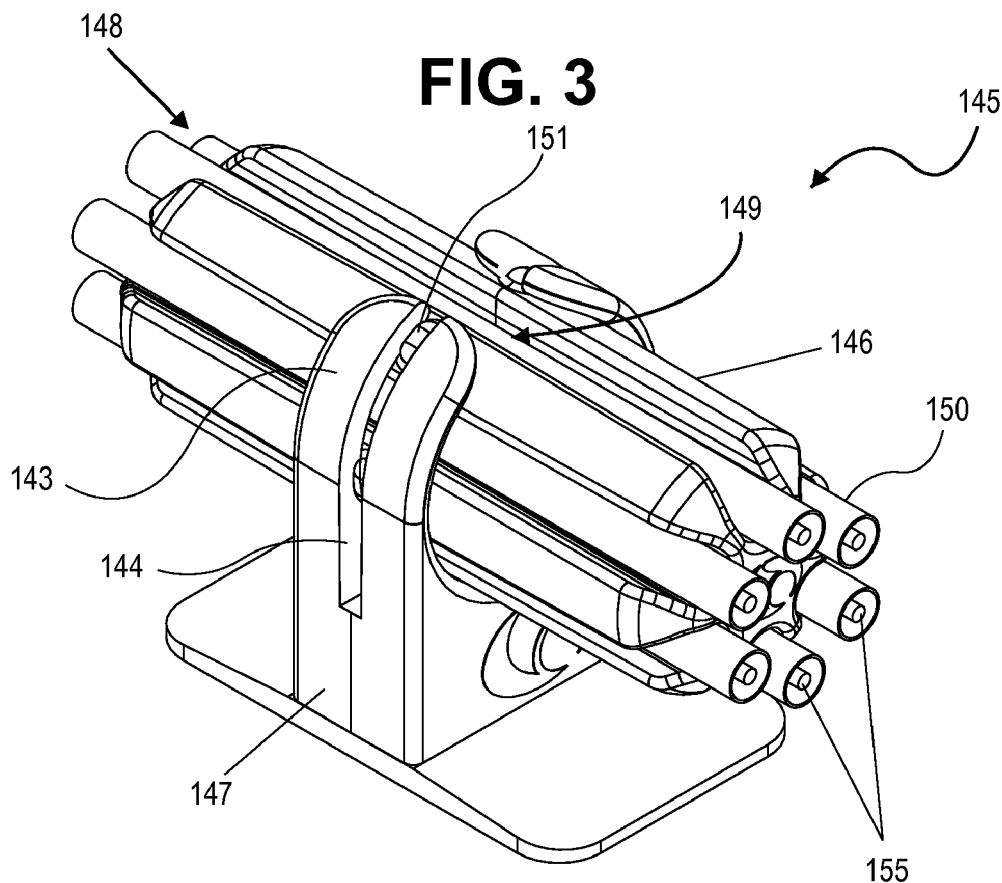
FIG. 3 is a perspective side view of the splice revolver to illustrate its mount.
Figure 4:
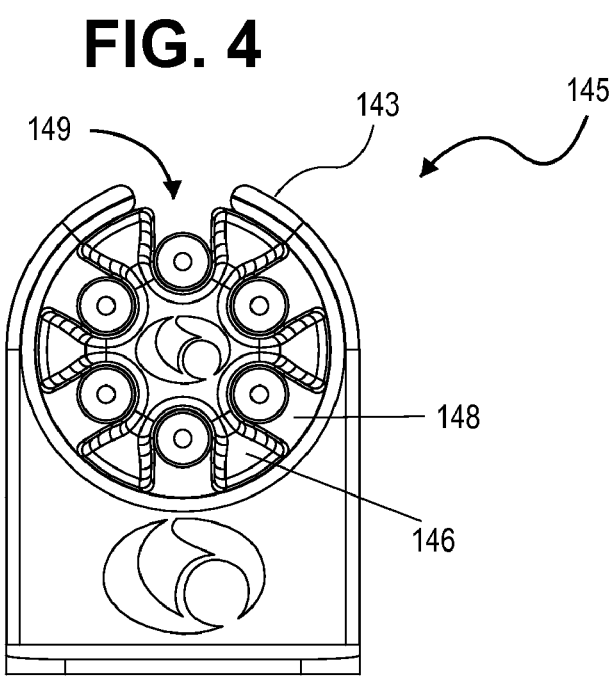
FIG. 4 is an end-on view of the splice revolver.

FIG. 3 is a perspective side view of the splice revolver 145 to illustrate its mount 147 in more detail; FIG. 4 is an end-on view of the splice revolver 145. Referring to FIGS. 3 and 4, the splice revolver 145 has a generally cylindrical revolver body 146. The body 146 includes a plurality of channels 148 formed along the length of the revolver body 146 in spaced relation to one another around a circumference of the body 146. The splice mount 147 includes a clamp portion 143 that partially encircles the revolver body 146 proximate a midpoint thereof, allowing the body 146 to revolve about a central axis thereof. The clamp portion 143 has an opening 149 to permit a channel 148 to be loaded with a splice sleeve 150 when the channel 148 is aligned with the opening 149, each splice sleeve 150 containing one or more glass fibers 155.

The mount 147 additionally includes a pair of slots 144, and the revolver body 146 includes a plurality of bosses 151. The bosses 151 are arranged in spaced relation to one another around a circumference of the body 146. As the revolver body 146 rotates within the clamp portion 143 of the mount 147, the bosses 151 travel within the slots 144 of the clamp portion 143 to hold the revolver 145 in the mount 147. Referring additionally to FIG. 7, a boss 151 is configured to engage the detents 141 to lock the revolver 145 in a closed position.

As shown in FIGS. 3 and 4, the revolver 145 includes six channels 148 to accommodate and hold splice sleeves 150 therein. However, fewer or greater than six splice sleeves 150 may be included in splice revolver 145.

Figure 5:
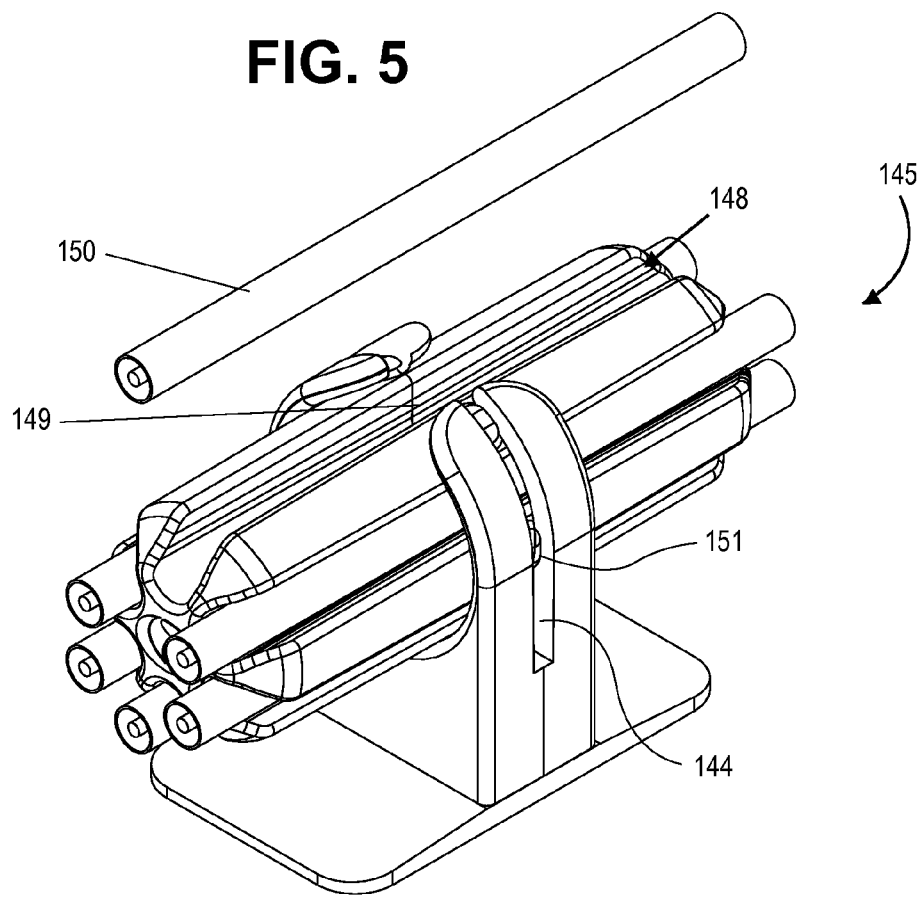
FIGS. 5 and 6 are perspective views of the splice revolver to illustrate loading of the splice sleeves into the splice revolver.
Figure 6:
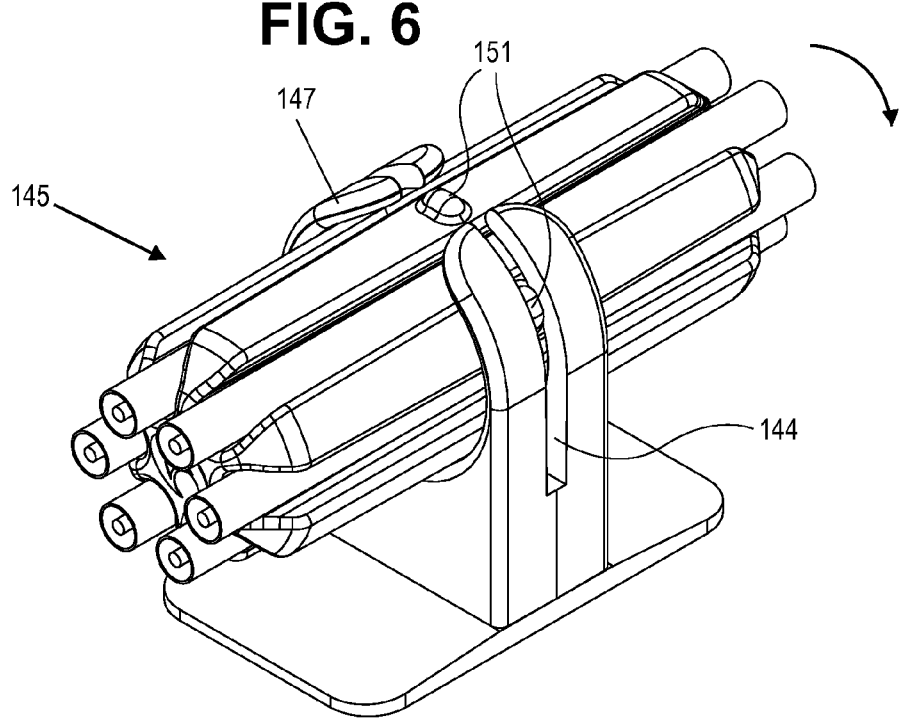

FIGS. 5 and 6 are perspective views of the splice revolver 145 illustrating loading of the splice sleeves 150 into the splice revolver 145. Once a cable (not shown) has had its jacket removed, each fiber 155 is spliced to a short fiber having a connector 160 at an opposite end using a splice sleeve 150. The sleeves 150 are loaded into the splice revolver 145. Excess lengths of the short fibers, with the connectors 160 at their ends, may be stored about the spool 125. Finally, the connectors 160 are snap-fit into the plurality of adaptors 120.

Figure 1:
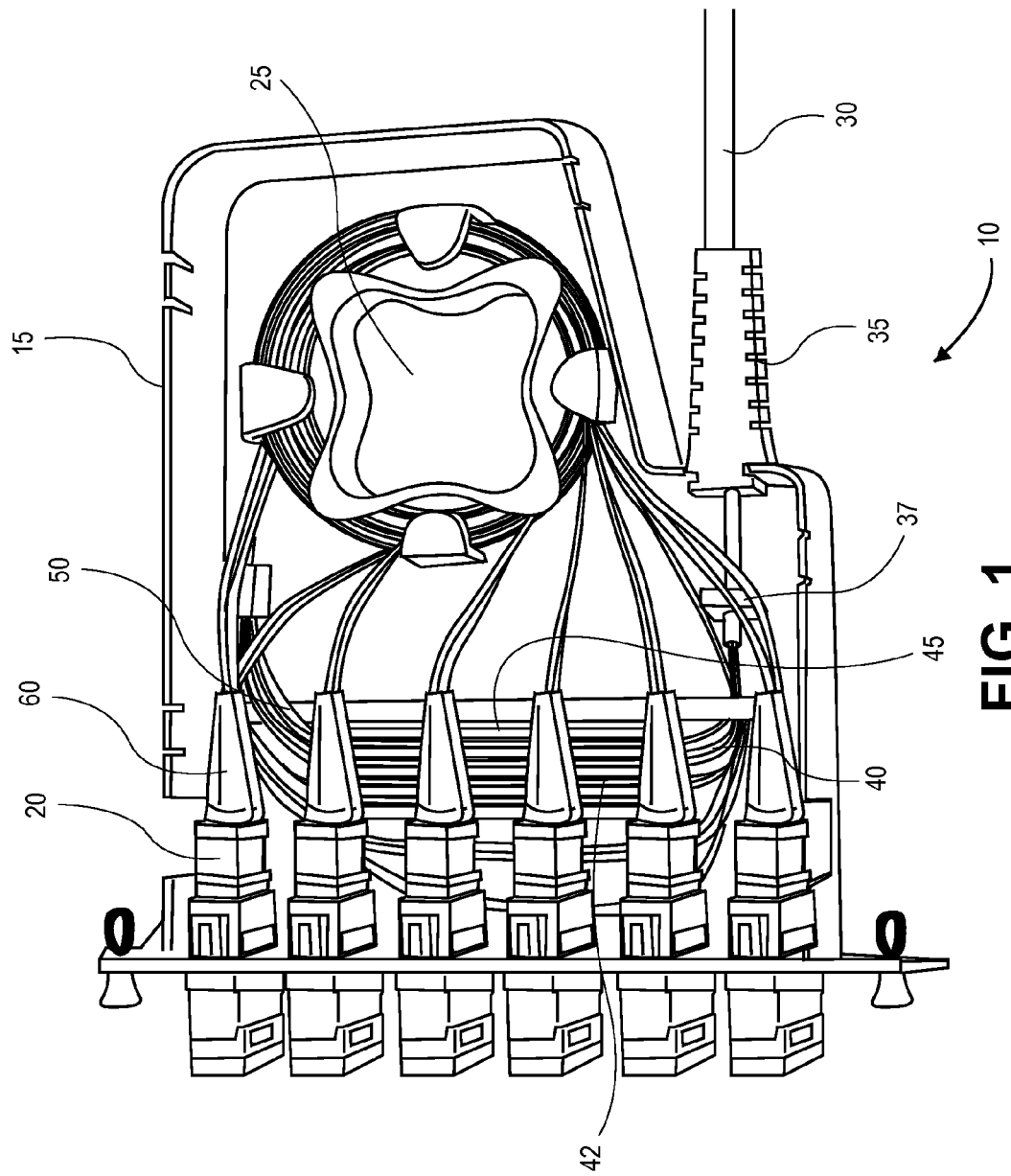
FIG. 1 is a top view of a conventional splice module.

Accordingly, in order to organize the fiber strands in the splice module 100, the cable (or multiple cables) is inserted through the strain relief boot(s) 135, the jacket is stripped, and then the glass fibers 155 are spliced to terminated fibers in the splice sleeves 150. Each splice sleeve 150 is sequentially loaded into an open channel 148 of the revolver body 146 as the revolver 145 is rotated. As noted previously, the body 146 rotates within the clamp portion 143 of the splice mount 147 so that each channel 148 may align with the opening 149 for dropping a splice sleeve 150 therein. As the splice sleeves 150 are sequentially dropped into the splice revolver 145, the fiber strands, represented by reference numerals 40 and 50 in FIG. 1, could twist as the splice revolver 145 rotates about its axis. To avoid fiber twisting, the installer merely needs to rotate the splice revolver 145 back to its original position after the splice sleeve 150 is installed. The terminated, spliced end with connectors 160 may then be wound around the spool 125 so as to route the plurality of connectors 160 to the plurality of adaptors 120.

The example embodiments being thus described, it will be obvious that the same may be varied in many ways. Such variations are not to be regarded as departure from the exemplary embodiments of the present invention. All such modifications as would be obvious to one skilled in the art are intended to be included within the scope of the following claims.

What is claimed is:

1. A splice holder comprising:
   a clamp;
   a revolver body having a generally cylindrical shape; and
   a plurality of splice holding channels extending from a first end of said cylindrical shape to a second end of said cylindrical shape,
   wherein said plurality of channels are formed into a sidewall of said cylindrical shape and are sized to accept splices, and
   wherein said revolver body is rotatably relative to said clamp while remaining attached to said clamp.

2. The splice holder of claim 1, wherein said clamp includes an opening permitting access to one of said plurality of channels while said clamp holds said revolver body, and wherein said revolver body may be rotated, while remaining attached to said clamp, to permit access to another of said plurality of channels via said opening of said clamp.

3. The splice holder of claim 2, wherein said revolver body may be rotated, while remaining attached to said clamp, to place a portion of said sidewall of said revolver body not having a channel formed therein at said opening of said clamp.

4. The splice holder of claim 1, wherein said revolver body is attached to said clamp in a manner permitting rotation of said revolver body in a clockwise and counter-clockwise direction about a central axis of said revolver body as desired by a user.

5. The splice holder of claim 1, wherein said revolver body includes six channels spaced evenly around said sidewall of said revolver body.

6. The splice holder of claim 1, wherein said clamp partially encircles said revolver body proximate a mid-point of said sidewall.

7. The splice holder of claim 1, wherein said revolver body includes first features and said clamp includes second features, and wherein said second features cooperate with said first features to lock said revolver body into one of several rotational positions relative to said clamp.

8. The splice holder of claim 7, wherein said several positions include six different positions aligning six channels of said revolver body with said opening of said clamp.

9. The splice holder of claim 7, wherein said several positions include six different positions aligning six channels of said revolver body with said opening of said clamp and six other positions aligning portions of said sidewall without a channel with said opening of said clamp.

10. A method of holding splices in a splice holder comprising:
    providing a clamp and a revolver body having a generally cylindrical shape, the revolver body including a plurality of splice holding channels extending from a first end of the cylindrical shape to a second end of the cylindrical shape, wherein the plurality of channels are formed into a sidewall of the cylindrical shape;
    inserting a first splice into one of the plurality of channels;
    rotating the revolver body relative to the clamp, while maintaining the attachment between the revolver body and the clamp; and
    inserting a second splice into another of the plurality of channels.

11. The method of claim 10, wherein the clamp includes an opening permitting access to the one of the plurality of channels while the clamp holds the revolver body, and wherein said rotating step places the another of the plurality of channels into alignment with the opening of the clamp.

12. The method of claim 11, wherein said rotating step includes rotating the revolver body in a clockwise direction prior to inserting the second splice, and further comprising:

rotating the revolver body in a counterclockwise direction to place a portion of the sidewall without a channel into alignment with the opening of the clamp.

13. A splice holder comprising:
   a clamp;
   a revolver body; and
   a plurality of splice holding channels extending from a first end of said revolver body to a second end of said revolver body,
   wherein said plurality of channels are formed into a sidewall of said revolver body and are sized to accept splices,
   wherein said clamp includes an opening permitting access to one of said plurality of channels while said clamp holds said revolver body, and wherein said revolver body may be rotated, while remaining attached to said clamp, to permit access to another of said plurality of channels via said opening of said clamp, and
   wherein said revolver body is attached to said clamp in a manner permitting rotation of said revolver body in a clockwise and counter-clockwise direction about a central axis of said revolver body as desired by a user.

14. The splice holder of claim 13, wherein said revolver body may be rotated, while remaining attached to said clamp, to place a portion of said sidewall of said revolver body not having a channel formed therein at said opening of said clamp.

15. The splice holder of claim 13, wherein said revolver body includes six channels spaced evenly around said sidewall of said revolver body.

16. The splice holder of claim 13 wherein said clamp partially encircles said revolver body proximate a mid-point of said sidewall.

17. The splice holder of claim 13, wherein said revolver body includes first features and said clamp includes second features, and wherein said second features cooperate with said first features to lock said revolver body into one of several rotational positions relative to said clamp.

18. The splice holder of claim 17, wherein said several positions include six different positions aligning six channels of said revolver body with said opening of said clamp.

19. The splice holder of claim 17, wherein said several positions include six different positions aligning six channels of said revolver body with said opening of said clamp and six other positions aligning portions of said sidewall without a channel with said opening of said clamp.

* * * * *